US012614846B2

(12) United States Patent
Singh et al.

(10) Patent No.: US 12,614,846 B2
(45) Date of Patent: Apr. 28, 2026

(54) BEAM SHAPING IN REFLECTIVE METASURFACE UTILIZING MECHANICAL LINEAR ACTUATORS WITH TEMPERATURE COMPENSATION

(71) Applicant: Dell Products L.P., Round Rock, TX (US)

(72) Inventors: Tejinder Singh, Manotick (CA); Navjot Kaur Khaira, Manotick (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/798,193

(22) Filed: Aug. 8, 2024

(65) Prior Publication Data

US 2026/0045692 A1 Feb. 12, 2026

(51) Int. Cl.
*H01Q 3/12* (2006.01)
*H01Q 1/48* (2006.01)
*H01Q 3/46* (2006.01)

(52) U.S. Cl.
CPC ................. *H01Q 3/46* (2013.01); *H01Q 1/48* (2013.01)

(58) Field of Classification Search
CPC ........ H01Q 3/02–08; H01Q 3/12; H01Q 3/32; H01Q 3/46; H01Q 15/00; H01Q 15/14; H01Q 19/10; H01Q 1/48; H01Q 9/0407; H01Q 21/06–08
See application file for complete search history.

(56) References Cited

U.S. PATENT DOCUMENTS

| | | | | |
|---|---|---|---|---|
| 9,640,867 | B2 | 5/2017 | Behdad et al. | |
| 10,938,115 | B2 * | 3/2021 | Urzhumov | H01Q 15/0066 |
| 11,990,671 | B2 * | 5/2024 | Bailey | H01Q 15/148 |

(Continued)

FOREIGN PATENT DOCUMENTS

WO 2024/141984 A1 7/2024

OTHER PUBLICATIONS

Non-Final Office Action received for U.S. Appl. No. 18/598,392 dated Aug. 13, 2025, 33 pages.

(Continued)

*Primary Examiner* — Hasan Islam

(74) *Attorney, Agent, or Firm* — Amin, Turocy & Watson, LLP

(57) ABSTRACT

The technology described herein is directed towards a design and implementation of a reconfigurable surface that reflects an impinging electromagnetic signal, with a phase profile determined by the curvature of a flexible metallic ground plane beneath metallic resonating elements of the reconfigurable surface. The amount of curvature forms different gaps between portions of the flexible ground plane and the respective metallic resonating elements above those portions, thereby determining the shape of the reflected beam. In one implementation, four individually controllable linear actuators are mechanically coupled to the corners of the ground plane of a metasurface (panel). These actuators enable a curvature phase profile, by determining the amount of curvature of a flexible, metallic ground, which allows a reflected beam to be shaped. Compensation for flex resulting from temperature is also provided. The design is low cost, yet operates on millimeter wavelength beams, which are useable in numerous wireless communication scenarios.

20 Claims, 18 Drawing Sheets

(56) References Cited

U.S. PATENT DOCUMENTS

2003/0043071 A1 3/2003 Lilly et al.
2020/0303828 A1 9/2020 Urzhumov

OTHER PUBLICATIONS

Mavridou et al., "Continuously Tunable mm-Wave High Impedance Surface", IEEE Antennas and Wireless Propagation Letters, vol. 15, 2016 , pp. 1390-1393.
Mavridou et al., "Dynamically Reconfigurable High Impedance and Frequency Selective Metasurfaces Using Piezoelectric Actuators", IEEE Transactions on Antennas and Propagation, vol. 64, No. 12, Dec. 2016, pp. 5190-5197.
Tawk et al., "Wirelessly Automated Reconfigurable Antenna with Directional Selectivity", IEEE, vol. 5, 2017, pp. 802-811.
Non-Final Office Action received for U.S. Appl. No. 18/598,416 dated Aug. 20, 2025, 33 pages.
Mouser.com, "MA4FCP200", Online available at URL: https://www.mouser.com/ProductDetail/MACOM/MA4FCP200?qs=sGAEpiMZZMvzlsPcC61n6mKOVZ%2FmvpYc%252BB8AMtXWKnE%3D, Retrieved from the Internet Feb. 6, 2024, 5 pages.
Mouser.com, "M74HC595YRM13TR", Online available at URL: https://www.mouser.in/ProductDetail/STMicroelectronics/M74HC595YRM13TR?qs=WHIX%252B%252B9%2FRwBw%252B7pGf3ngqg%3D%3D&srsltid=AfmBOorvjakoPLMRsZ0kVgBNywuaPOlfuFYr7lwnZdOkq2ahHzh8wcED, Retrieved from the Internet Feb. 6, 2024, 5 pages.
Mouser.com, "ABX00080", Online available at URL: https://www.mouser.com/ProductDetail/Arduino/ABX00080?qs=ulEaXIWI0c9tbG%2FHj5EzRA%3D%3D, Retrieved from the Internet Feb. 6, 2024, 4 pages.
Mouser.com, "A000079", Online available at URL: https://www.mouser.in/ProductDetail/Arduino/A000079?qs=gMoqXxk%2F%2F5arITJCT4KaEg%3D%3D&srsltid=AfmBOooAdYDsoPUq6_Ghclcv9xTXa_IhVazpY9cvU2dybVtp9Wo7ao2w, Retrieved from the Internet Feb. 6, 2024, 5 pages.
Mouser.com, "195200-237", Online available at URL: https://www.mouser.in/ProductDetail/Ledex/195200-237?qs=byeeYqUlh0OpzXo5InRdYQ%3D%3D&srsltid=AfmBOoqOryT5oemQdwxfa0CYRK7KifYcATI2G-INVM3K9GaTVSYxS3KP, Retrieved from the Internet Feb. 6, 2024, 4 pages.
Ericcson, "5G Advanced: Evolution towards 6G", Ericsson White Paper, BNEW-22:024836 Uen, Jun. 2023, 21 pages.
Nokia Bell Labs, "Communications in the 6G Era", WhitePaper, Sep. 9, 2020, 19 pages.
Subrt et al., "Controlling Propagation Environments Using Intelligent Walls", 6th European Conference on Antennas and Propagation, Mar. 26, 2012, 5 pages.
Kaina et al., "Shaping Complex Microwave Fields in Reverberating Media with Binary Tunable Metasurfaces", Scientific Reports, vol. 4, No. 6693, Oct. 21, 2014, pp. 1-7.
Dai et al., "Reconfigurable Intelligent Surface-Based Wireless Communications: Antenna Design, Prototyping, and Experimental Results", IEEE Access, vol. 8, Mar. 2, 2020, pp. 45913-45923.
Huang et al., "Reconfigurable Metasurface for Multifunctional Control of Electromagnetic Waves", Advanced Optical Materials, vol. 5, No. 22, 2017, pp. 1-7.
Baladi et al., "Dual-Band Circularly Polarized Fully Reconfigurable Reflectarray Antenna for Satellite Applications in the Ku-Band", IEEE Transactions on Antennas and Propagation, 2021, 10 pages.
Pi-USA. US, "p. 088 Round PICMAR Stack Multilayer Piezo Actuator", Online available at URL: https://www.physikinstrumente.com/en/products/piezoelectric-transducers-actuators/p-088-round-picma-stack-multilayer-piezo-actuator-100821, Retrieved from the Internet Feb. 6, 2024, 6 pages.
Pi-USA. US, "P-216 PICA Power Piezo Actuators", Online available at URL: https://www.pi-usa.us/en/products/piezo-actuators-stacks-benders -tubes/p. 216-pica-power-piezo-actuator-101555, Retrieved from the Internet Feb. 6, 2024, 6 pages.
Schmitt et al., "Design and Fabrication of MEMS Reflectors for THz Reflect-Arrays", Fourth International Workshop on Mobile Terahertz Systems (IWMTS), 2021, 5 pages.
Kim et al., "Independently Polarization Manipulable Liquid-Crystal-Based Reflective Metasurface for 5G Reflectarray and Reconfigurable Intelligent Surface", IEEE Transactions on Antennas and Propagation, vol. 71, No. 8, Aug. 2023, pp. 6606-6616.
Singh, et al. "Beam Shaping in Reflective Metasurface Utilizing Mechanical Linear Actuators" U.S. Appl. No. 18/598,392, filed Mar. 7, 2024, 41 pages.
Singh, et al. "Beam Steering and Beam Shaping in Reflective Metasurface Utilizing Linear Motion and Mechanical Actuators" U.S. Appl. No. 18/598,416, filed Mar. 7, 2024, 65 pages.
Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.
Singh, et al. "Beam Shaping in Reflective Metasurface Utilizing Mechanical Linear Actuators With External Stimulus Compensation" U.S. Appl. No. 19/040,825, filed Jan. 29, 2025, 50 pages.
Notice of Allowance received for U.S. Appl. No. 18/598,392 dated Feb. 24, 2026, 11 pages.
Final Office Action received for U.S. Appl. No. 18/598,416 dated Feb. 4, 2026, 26 pages.

* cited by examiner

BEAM SHAPING IN REFLECTIVE METASURFACE UTILIZING MECHANICAL LINEAR ACTUATORS WITH TEMPERATURE COMPENSATION

BACKGROUND

Reconfigurable intelligent surfaces, sometimes referred to as metasurfaces, redirect (e.g., reflect or refract) incoming electromagnetic beams in a fixed direction, by modifying the resultant beams in terms of phase, amplitude, and polarization. As such, reconfigurable surfaces are being investigated for use in the millimeter wave (mmWave) spectrum, where reflected beams can avoid obstacles that otherwise block a signal between a transmitter (e.g., a base station) and a receiver (e.g., a user equipment).

Some current electronically tunable designs depend on PIN diodes and/or varactors acting as switches between metallic patterns. Commonly available PIN diodes and varactors have a number of problems, however, including low maximum operating frequencies and other frequency-dependent characteristics such as narrow bandwidth, which limits their use at mmWave frequencies. PIN diodes and varactors offer high losses and parasitic effects that are particularly severe at mmWave frequencies, which is not desirable for high frequency performance. Further, there is only limited reconfigurability achieved using PIN diodes and varactors at mmWave operational range; for example, PIN diodes offer only either ON or OFF states, whereby only two reconfigurable states of phase are possible from using a single PIN diode in a metasurface. Still further, on-chip components like varactors/PIN diodes need to be soldered in each reconfigurable intelligent surface element. For low frequencies, when the individual cell size is large, this approach can still be employed, however at mm Wave frequencies (30-300 GHz), soldering becomes a challenge with the shrinking cell size, making the device performance highly sensitive to the type and quality of the assembly and packaging process.

Current metasurfaces based on PIN diodes and varactors are also expensive. For example, in one metasurface of unit cells, for bias control each unit cell needs eight varactors and one operational amplifier (op-amp) integrated circuit to provide the desired voltage gain to actuate the varactors. Hence, for an 8×8 array, 512 varactors and 64 op-amps are required. For larger RIS arrays, the complexity of bias control will scale multifold.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
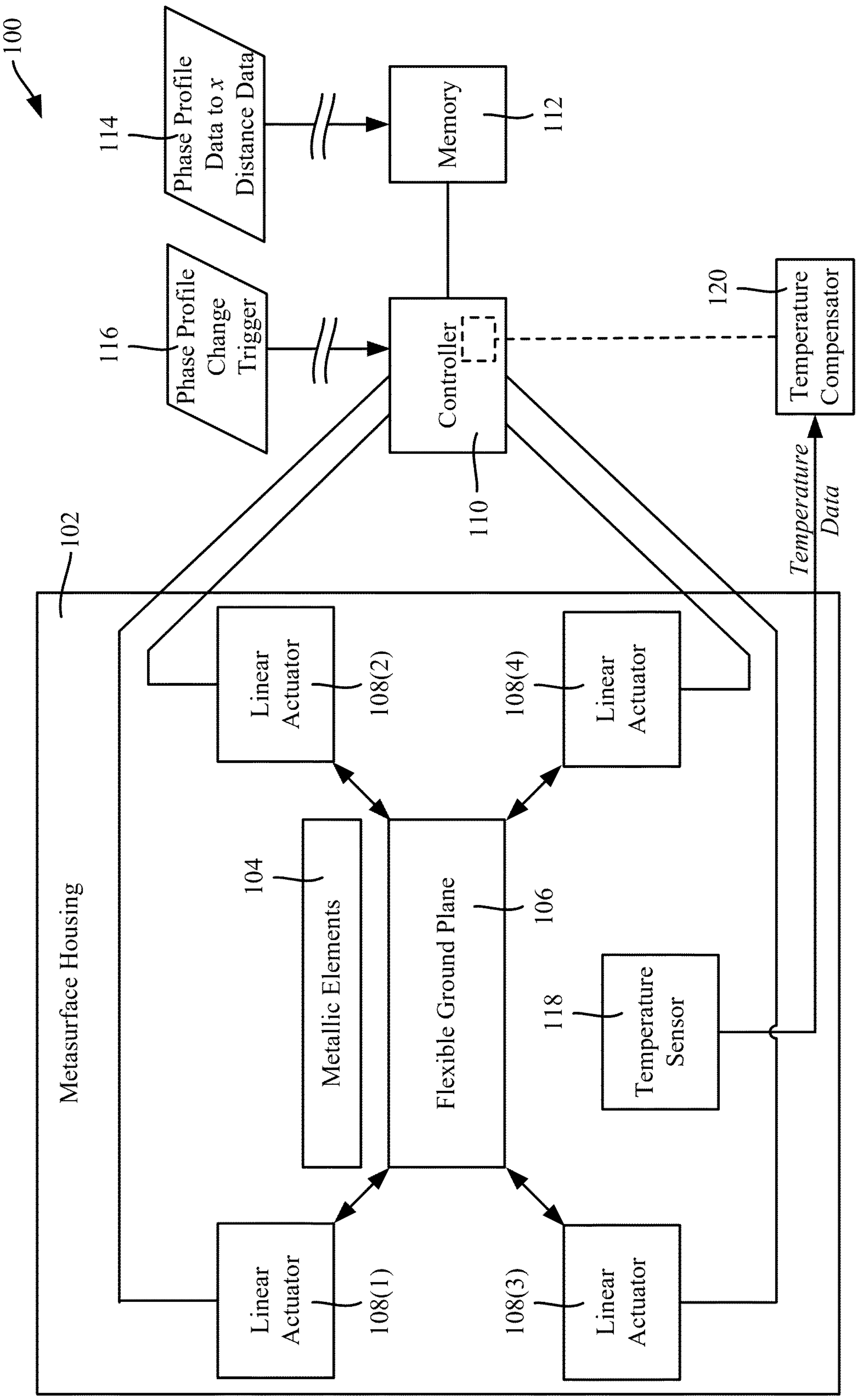
FIG. 1 is an example conceptual block diagram showing a reconfigurable surface (metasurface) in which linear motion actuators curve a ground plane, including based on temperature compensation, to achieve analog and dynamic beam shaping of a reflected electromagnetic signal, in accordance with various example embodiments and implementations of the subject disclosure.

The technology described herein is generally directed towards low-cost beam shaping using reflective metasurfaces (reconfigurable surfaces) that are coupled to mechanical linear actuators. The technology described herein is based on advanced metasurfaces with analog style beam shaping capabilities, which dynamically and accurately manipulate reflected signal directions.

In one implementation, four individually controllable linear actuators are mechanically coupled to the corners of a ground plane (a flexible, thin metallic sheet) of a metasurface (panel). These actuators enable a curvature phase profile, by determining the curvature of the flexible, metallic ground plane, which allows a reflected beam to be shaped. A temperature compensation device integrated in the panel is used to offset any flexing of the thin metallic sheet due to temperature variations that occur over time, such as in outdoor environments that experience extreme (or even significantly small) temperature changes, e.g., over time.

The technology described herein is based on an air cavity formed between a periodic resonating metallic surface on a dielectric substrate and a floating ground plane made using a flexible thin metal sheet. By employing linear motion actuators that support and provide linear force to the flexible thin metal sheet, e.g., at each of its four corners, the amount of curvature of the metal sheet is adjustable, which can significantly alter the reflection phase response, including at operational frequencies around 28 GHz. This alteration is driven by the actuators' precision movement, which compresses the flexible sheet towards inside of the cavity, whereby the curvature can be adjusted in analog style. The actuators can similarly be controlled in the opposite direction to decompress the flexible sheet. The amount of curvature of the flexible sheet determines the phase reflection, which is dependent on the variable distances (e.g., heights if positioned vertically) of the air gaps. Leveraging the linear motion actuators and providing bias to the actuators offers a gradient phase profile to the entire metasurface array, facilitating precision-tuning of the reflection characteristics, which results in beam shaping.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and reconfigurable intelligent surfaces in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual block depiction of an example system 100 including a metasurface housing 102, which, via metallic elements 104 and a flexible ground plane 106, corresponds to a metasurface that reflects an impinging (incoming) signal, (an electromagnetic (EM)/radio frequency (RF) wave), such as near or within the millimeter wavelength, e.g., above 15 gigahertz.

In one implementation, four linear actuators 108(1)-108(4) are mechanically coupled (e.g., at forty-five degrees) to force the flexible ground plane 106 desired distance amounts toward a center point of the metallic elements 104, or pull them back to create less (or no) curvature in the ground plane. As will be understood, inward or outward movement of the actuators curves the flexible ground plane 106 to desired amounts, resulting in differences in distances (gaps) between individual portions of the ground plane 106 and corresponding individual resonating metallic patterns of the metallic elements 104.

A controller 110 drives the linear actuators 108(1)-108(4) a desired distance (e.g., in what can be considered a +x or −x direction from the perspective of the actuators), to determine the amount of curvature of the flexible ground plane 106. Electrical driving circuits or the like (not explicitly shown) can be used as needed to provide sufficient power to the linear actuators 108(1)-108(4), e.g., for a controller that outputs only low voltage/low current signals that thus indirectly drive the linear actuators 108(1)-108(4).

The controller 110 can be coupled to a memory 112 that contains the phase profile data (e.g., including the actuator distances) needed to curve the flexible ground plane 106 the desired amounts that result in a desired phase profile for the reflected beam. Multiple sets of phase profile data/actuator distances may be written or downloaded to (e.g., block 114) and/or maintained in the memory 112 as needed, and a suitable phase profile trigger (e.g., block 116) can be used to instruct the controller 110 as to which set of phase profile data to use to correspondingly drive the linear actuators 108(1)-108(4) to beamform/shape the reflected beam. The reflected beam thus may be dynamically reshaped in a relatively fast manner, based only on how fast the actuators can flex the flexible ground plane 106 to the specified phase profile data's amount of curvature.

Further, a temperature sensor 118 and temperature compensator 120 can be used to offset the amount of linear actuator driving, to compensate for differences in temperature that are experienced over time, which also influence the amount of flex of the flexible ground plane 106. The temperature compensator 120 can be implemented as logic in the controller 110, e.g., that operates by accessing a temperature compensation lookup table or the like (FIG. 2A) in the memory 112, which the controller 110 accesses based on the temperature data output of the temperature sensor 118. Alternatively, the temperature compensator 120 can be implemented as a separate device (FIG. 2B), which can output temperature-based offset, e.g., offset voltage that is combined with the controller's non-offset driving voltage(s), to drive the linear actuators 108(1)-108(4).

Figure 2A:
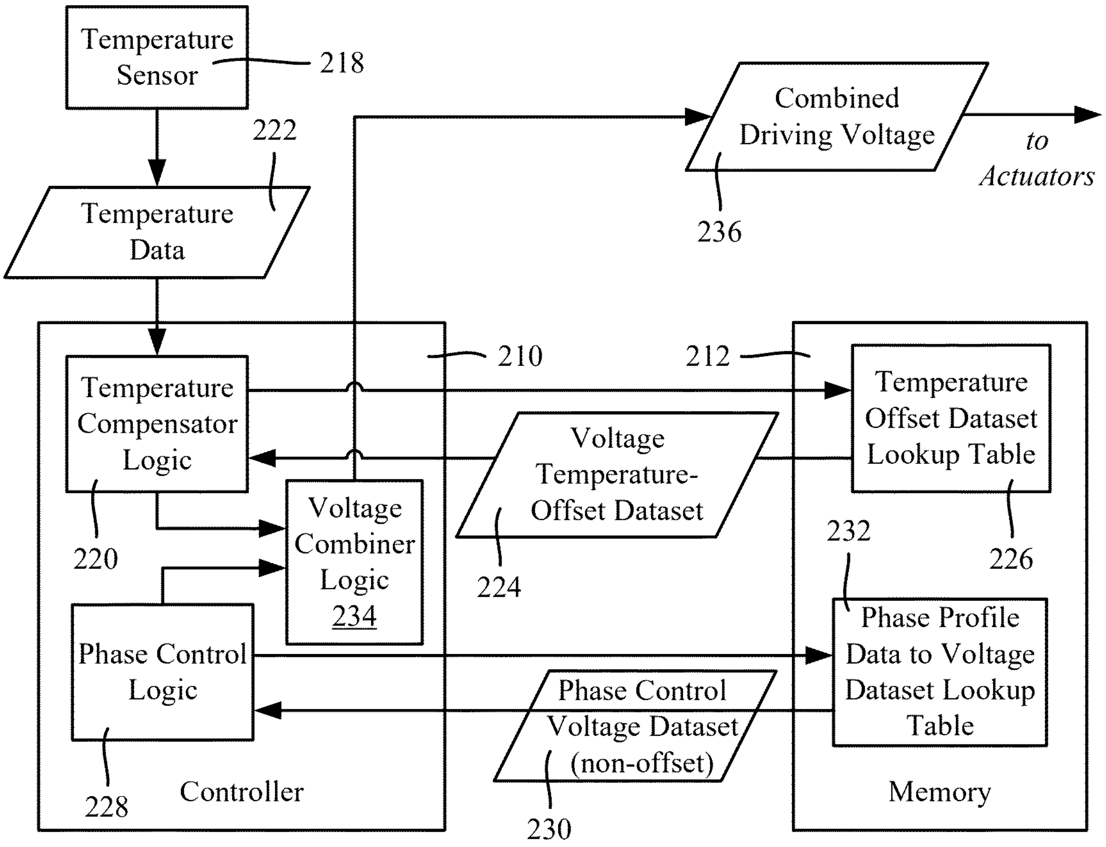
FIG. 2A is block diagram representation of one example implementation in which a controller obtains temperature data and phase data to determine linear motion actuation amounts with respect to curving a ground plane, in accordance with various example embodiments and implementations of the subject disclosure.

FIG. 2A shows an example implementation in which the temperature compensator 120 of FIG. 1 is incorporated into temperature compensator logic 220 in a controller 210. A temperature sensor 218 outputs temperature data 222, e.g., a voltage, current, digital value and/or the like that the temperature compensator logic 220 understands represents the measured temperature, e.g., of the ground plane or near the ground plane. Based on the temperature data 222, the controller 210 obtains a temperature offset dataset 224 (e.g., a positive or negative offset bias voltage) from an offset dataset lookup table 226 or the like in a memory 212. Note that a formula or the like, custom-determined for the ground plane, may provide a similar temperature-based offset voltage dataset.

The controller 210 also includes phase control logic 228 that retrieves the phase profile data 228, e.g., a non-offset bias voltage dataset 230 for driving the actuators, e.g., the same or different amounts for each actuator, obtained from a phase profile data lookup table 232 in the memory 212. This non-offset dataset 230 (e.g., one or more actuator driving voltages) determines the amount of linear actuator displacement based on the desired phase profile for the metasurface, e.g., at an ambient design temperature.

Voltage combiner logic 234 combines value(s) in the temperature offset dataset 224 with the values in the phase profile's non-offset bias voltage dataset 230, to output a combined driving voltage dataset 236 for the actuators. For example, if the non-offset voltage dataset outputs information to drive actuator (1) with X volts, and the temperature offset dataset outputs information to offset actuator (1) with −Y volts, the amount that actuator (1) is driven (linearly displaced) corresponds to X-Y volts.

Figure 2B:
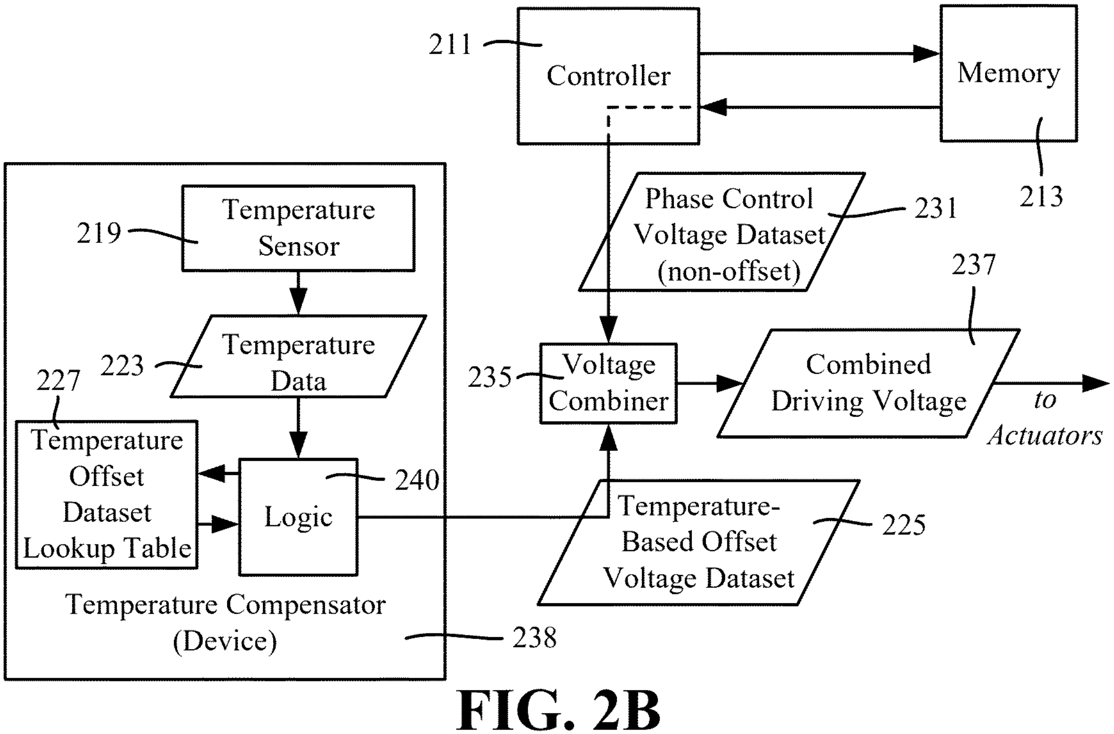
FIG. 2B is block diagram representation of an example alternative implementation in which a controller via phase data, and a temperature compensation device via temperature data, determine linear motion actuation amounts with respect to curving a ground plane, in accordance with various example embodiments and implementations of the subject disclosure.

FIG. 2B shows an alternative implementation in which a temperature compensator device 238, e.g., incorporating or closely coupled to a temperature sensor 219, determines the temperature-based offset voltage dataset 225. In general, logic 240 in the temperature compensator device 238 (e.g., a microcontroller therein) obtains the temperature-based offset voltage dataset 225 from a temperature offset dataset lookup table 227. Note that a formula or the like, custom-determined for the ground plane, may provide a similar temperature-based offset voltage dataset.

Similar to FIG. 2A, a controller 211 obtains a phase control voltage dataset 231 from a memory 213. A voltage combiner 235 combines the voltage datasets to output a combined driving voltage dataset 237 for driving the actuators the appropriately combined phase-based offset and temperature-based offset amounts.

Figure 3:
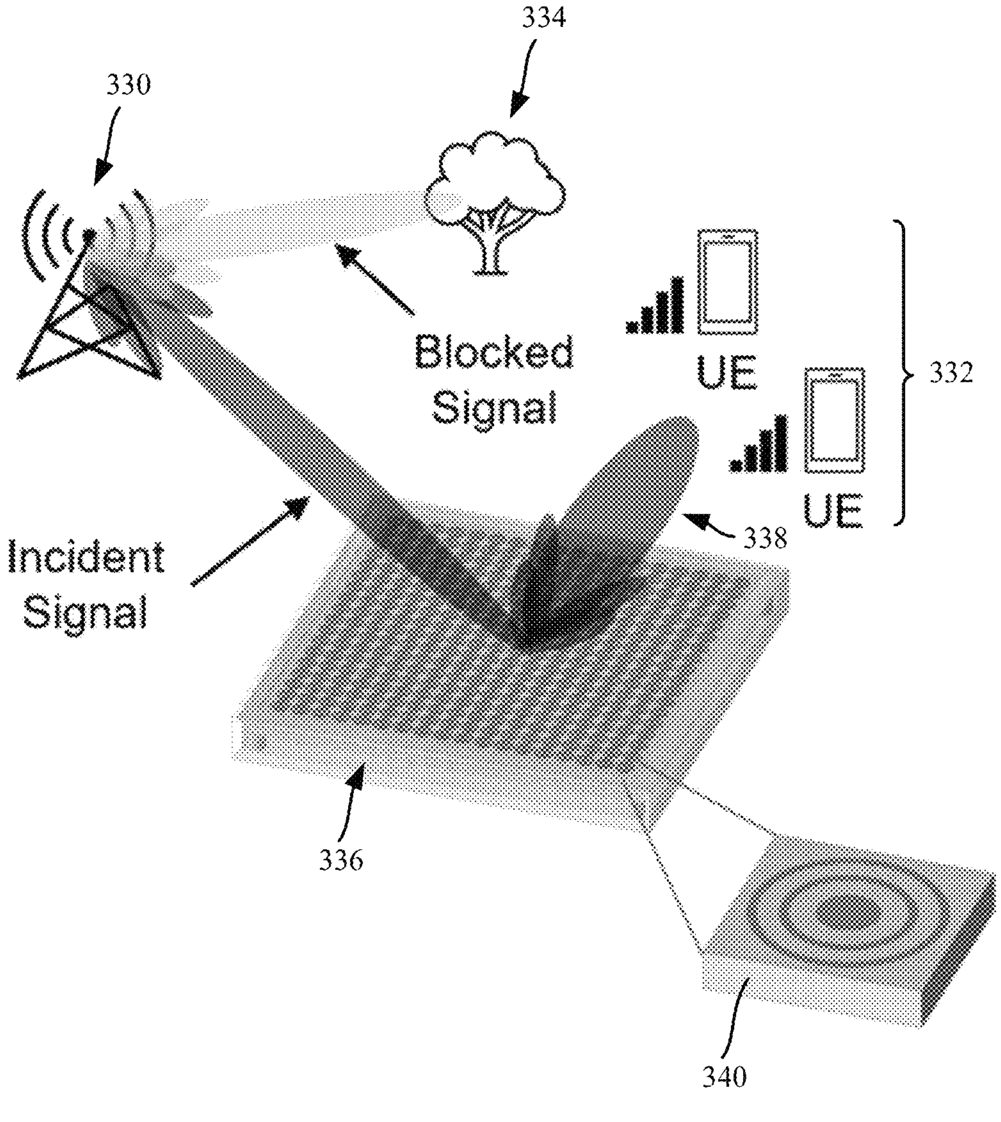
FIG. 3 is an example representation of one use-case scenario in which a reconfigurable surface shapes a broader, lower-gain beam (relative to FIG. 4) to provide coverage to nearby user equipment devices, in accordance with various example embodiments and implementations of the subject disclosure.
Figure 4:
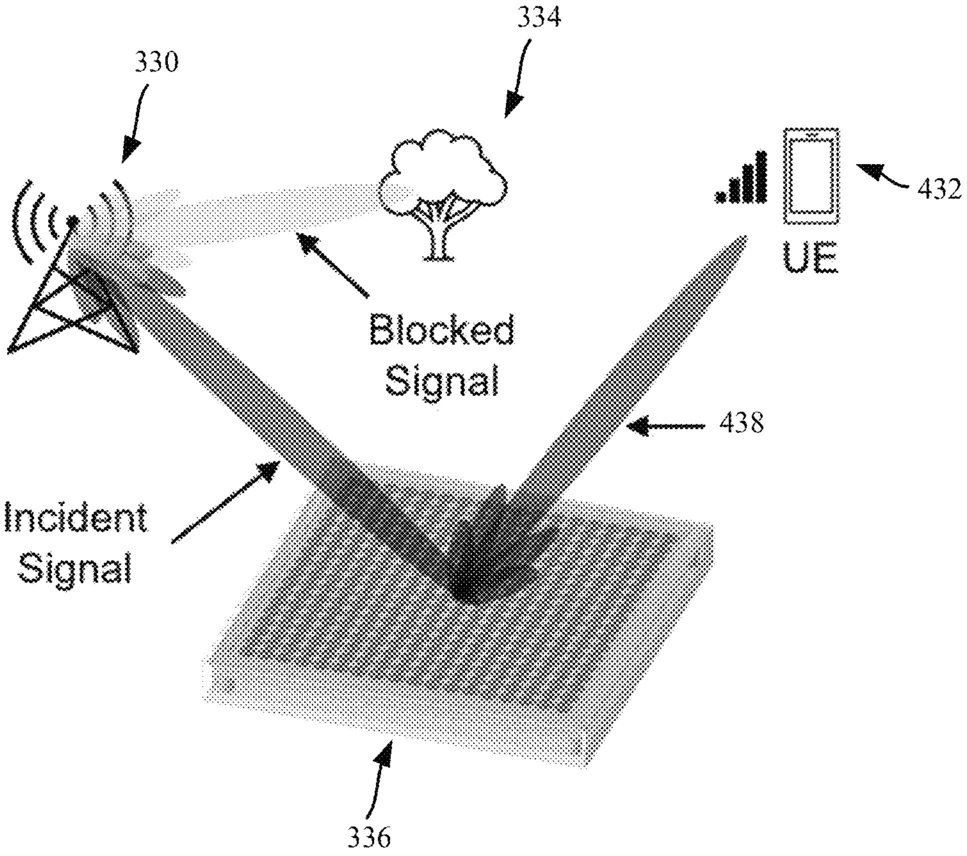
FIG. 4 is an example representation of another use-case scenario in which the reconfigurable surface shapes a narrower, higher-gain beam (relative to FIG. 3) to provide coverage to a user equipment device at a larger distance, in accordance with various example embodiments and implementations of the subject disclosure.
Figure 5A:
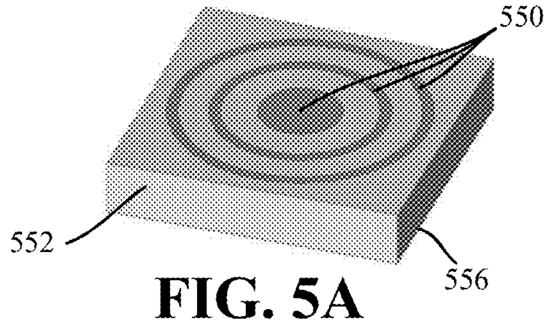
FIGS. 5A-5D are example representations of different air cavity thickness (gaps) separating a substrate of a unit cell from a corresponding portion of the flexible metallic ground plane as the flexible ground plane is curved in different amounts to achieve reconfigurability in the reflected signal, in accordance with various example embodiments and implementations of the subject disclosure.
Figure 5B:
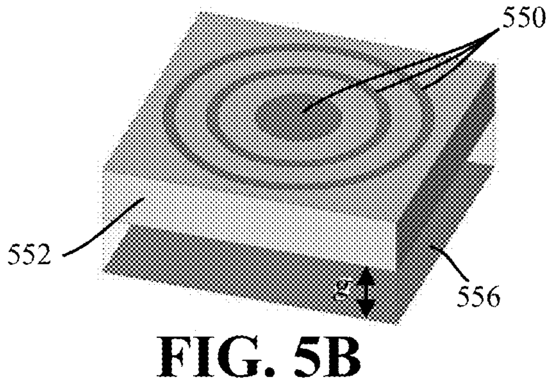
Figure 5C:
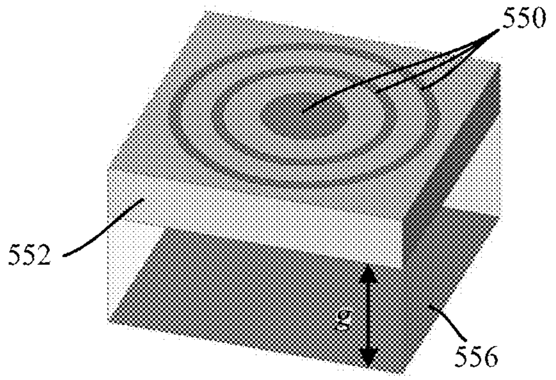
Figure 5D:
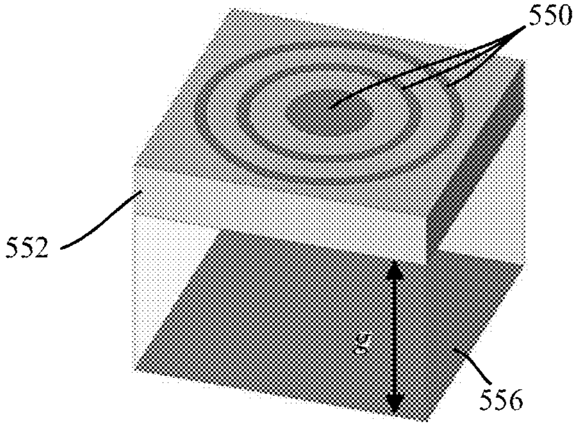

FIGS. 3 and 4 are examples of typical use-case scenarios based on controlled variable beam shaping as described herein. As shown in FIG. 3, in one direction a signal from a base station 330 to nearby user equipment (UEs) 332 is blocked by an obstacle 334. At the same time, an incident signal from the base station 330 reaches a metasurface panel 336 as described herein, which has a phase profile that reflects a broader (relative to FIG. 4) beam 338 to the nearby UEs 332.

As described herein, the reflected beam is shaped based on the phases of the unit cells of the metasurface panel 336; one such unit cell shown in FIG. 3 as the enlarged unit cell 340. Note that one example metallic resonating pattern of the unit cell 340 is depicted in the form of a concentric ring-shaped metallic pattern, with that pattern resonating at a frequency that corresponds to the frequency of the incoming signal. Notwithstanding, a unit cell can have a resonating pattern of any suitable shape (e.g., square, rectangular and so on) that resonates at or near a corresponding frequency of the incoming signal, and is not limited to concentric ring patterns.

In contrast to the scenario depicted in FIG. 3, as shown in FIG. 4, in the same direction the signal from the base station 330 to a more distant user equipment (UE) 432 is also blocked by the obstacle 334. In this alternative example scenario, the incident signal from the base station 330 similarly reaches the metasurface panel 336, which has a phase profile that reflects a narrower (relative to FIG. 3) and higher gain beam 438 to the more distant UE 432. Thus, the metasurface panel 336 as described herein can provide coverage to nearby UE(s) via a broader reflected beam, or to more distant UE(s) with a beam that is tuned more narrowly (and hence has higher gain). As described herein, the beam shape can be tweaked between broad and narrow based on the curvature of the ground plane of the metasurface.

In general, the reflective metasurface 336 of FIG. 3 (and FIG. 4) is formed by a two-dimensional periodic array of unit cells. The unit-cell structure is shown in FIGS. 5A-5D. In this depicted example embodiment, metallic concentric circular loops 550 are printed on a substrate 552, e.g., a 1.0 mm thick FR4 substrate. The substrate 552 is placed over a ground plane portion 556 (the ground plane's portion/area directly beneath the circular loops 550) forming an air cavity having a variable distance, or gap g as labeled in FIGS. 5B-5D, in which the gap's distance is based on the curvature of the flexible ground plane (which can be different in each ground plane portion below each unit cell) relative to the resonating metallic concentric circular loops 550/the substrate 552. The reflection phase response of the structure is strongly dependent on the cavity thickness, which leads to a significant tuning range for beam shaping. The air cavity thickness gap g separating the substrate, and the flexible metallic bottom sheet (ground plane) is movable, based on curving the flexible ground plane to achieve the reconfigurability in the reflected signal.

Figure 6:
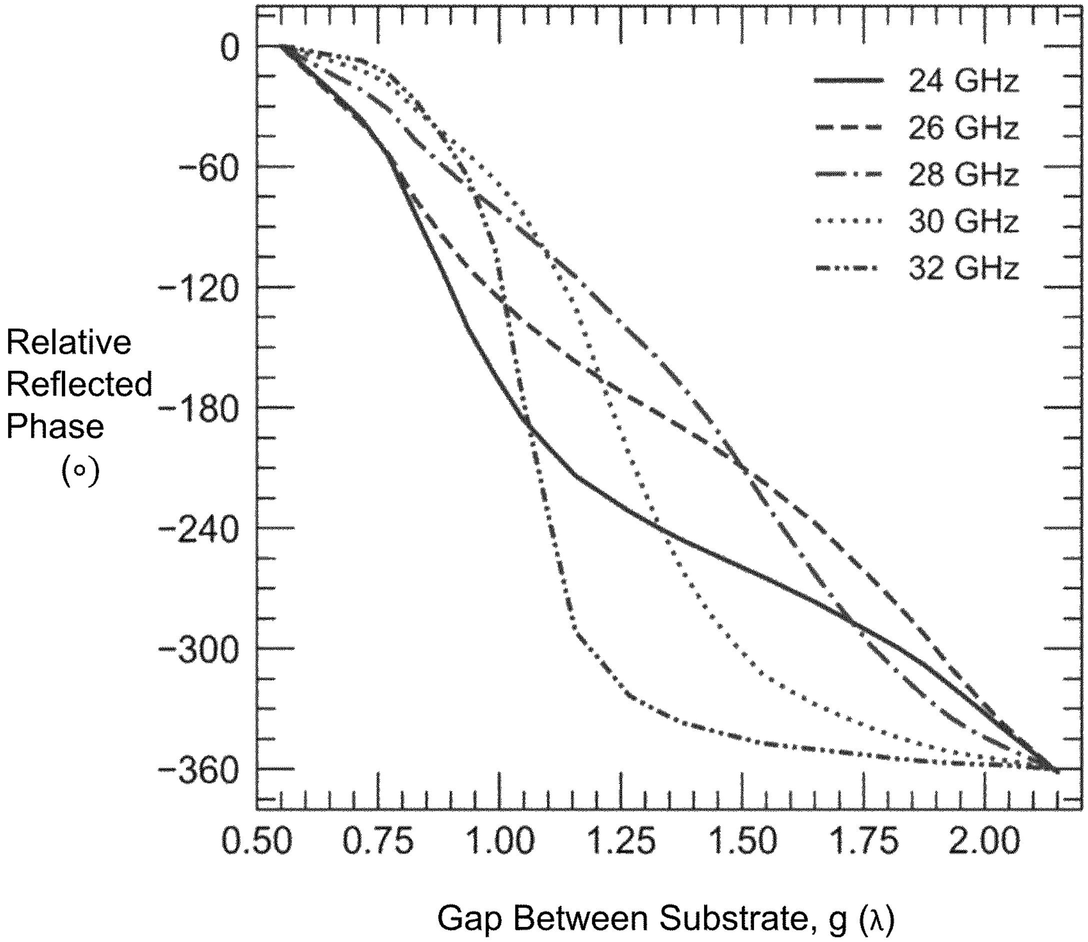
FIG. 6 is an example graph showing a simulation of relative reflected phases at different millimeter wave (mmWave) operational frequencies with flexible metallic ground plane changes in gap distances between a substrate and the flexible metallic ground plane, in accordance with various example embodiments and implementations of the subject disclosure.

FIG. 6 graphically shows example results obtained from a simulation with different frequencies at different gap distances. As can be seen, the simulated relative reflected phase (in degrees) of relative reflected phase at different mm Wave operational frequencies for a given wavelength (2) depends on the amount of gap, which is changeable as described herein, between the substrate and the metallic sheet/ground plane. FIG. 6 highlights how the surface can operate over a large bandwidth of 24-32 GHz with phase change achieved by changing the gap between the substrate and the movable metallic sheet.

Figure 7:
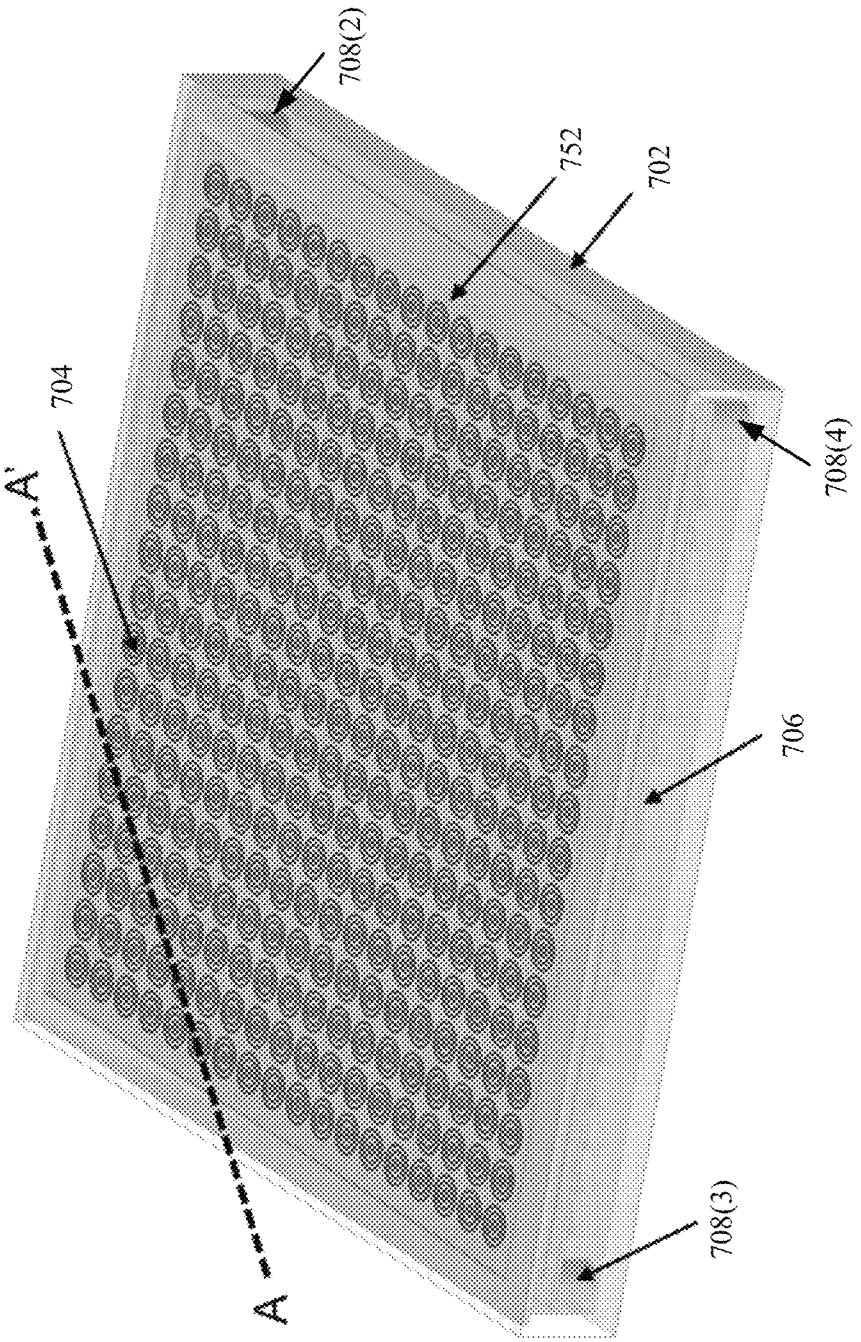
FIG. 7 is an isometric full section view of an example reconfigurable surface including components within a housing, in accordance with various example embodiments and implementations of the subject disclosure.
Figure 8:
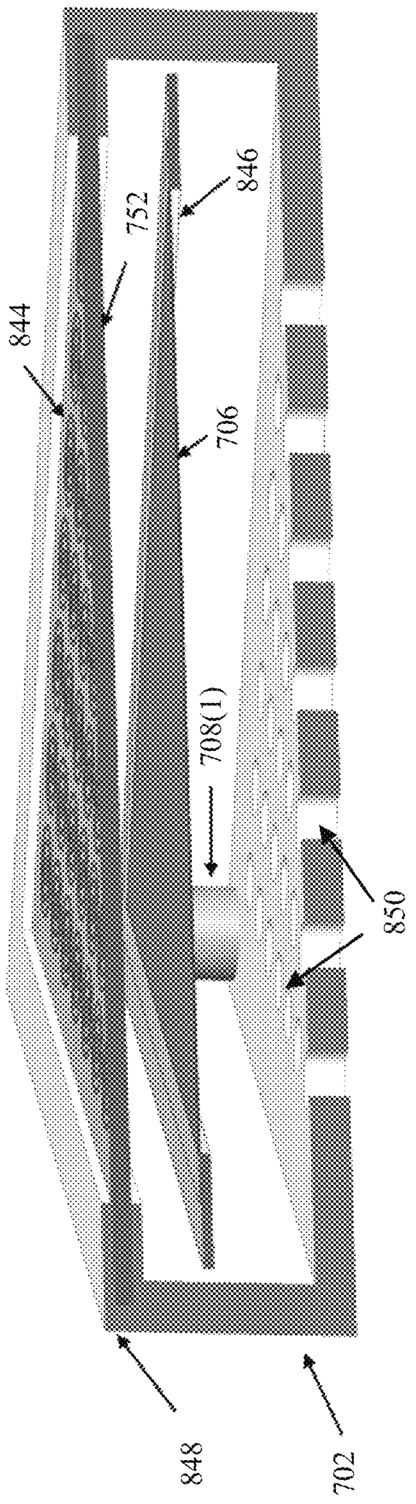
FIG. 8 is a sectional view (based on the cut-plane A-A' of FIG. 7) of the example reconfigurable surface including components within a housing, in accordance with various example embodiments and implementations of the subject disclosure.
Figure 9:
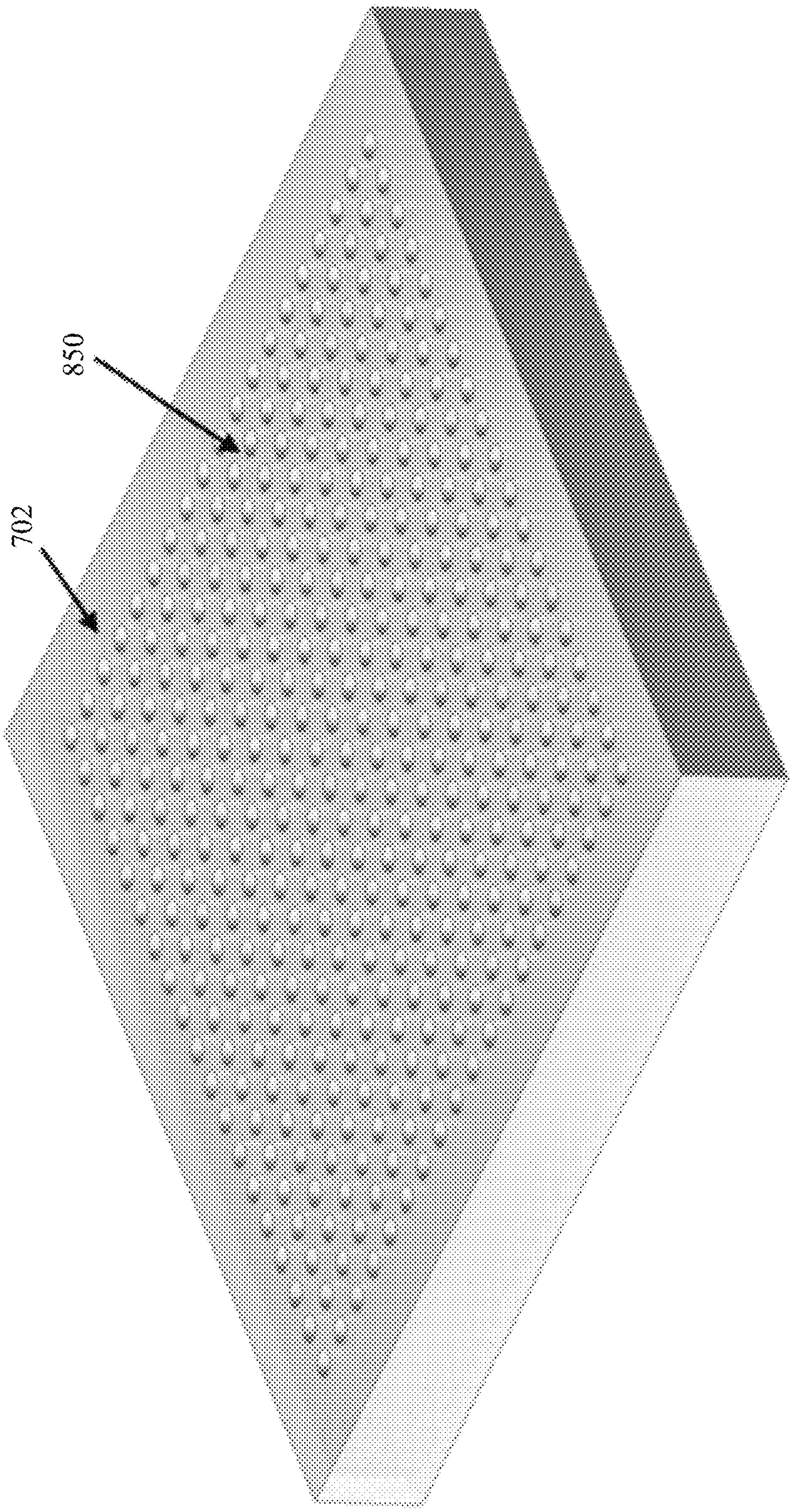
FIG. 9 is a back side view of the example reconfigurable surface housing showing perforations to reduce air damping, in accordance with various example embodiments and implementations of the subject disclosure.

The beam shaping functionality can be incorporated into a complete product, such as shown in FIGS. 7-9. More particularly, FIG. 7 shows a 3D isometric view of a panel with housing 702 and other components, including one labeled metallic element 704 of the multiple (e.g., 18×18 in this example) unit cells on a substrate 752. The flexible metal plane 706 is curved by the actuators, one in each corner, including at least part of the (visible in FIG. 7) actuators 708(2)-708(4). A cut plane (A-A') is highlighted in FIG. 7, to show the interior of the structure in FIG. 8.

In FIG. 8, the sectional view (corresponding to the cut plane A-A' of FIG. 7) of the housing 702 is shown with unit cells (collectively 844) above the substrate 752. One type of anchor is a support anchor 846 that supports one of the four corners of the moveable (flexible) ground plane 706. Other anchors, including the unit cell substrate anchor labeled 848, support the unit cells 844 including the substrate 752. FIG. 8 also shows perforations (collectively 850), which help to avoid any air damping, facilitate heat dissipation, and result in weight reduction of the panel. The reverse side of the panel is shown in FIG. 9, which highlights these perforations 850 in the underside of the housing 702.

Figure 10:
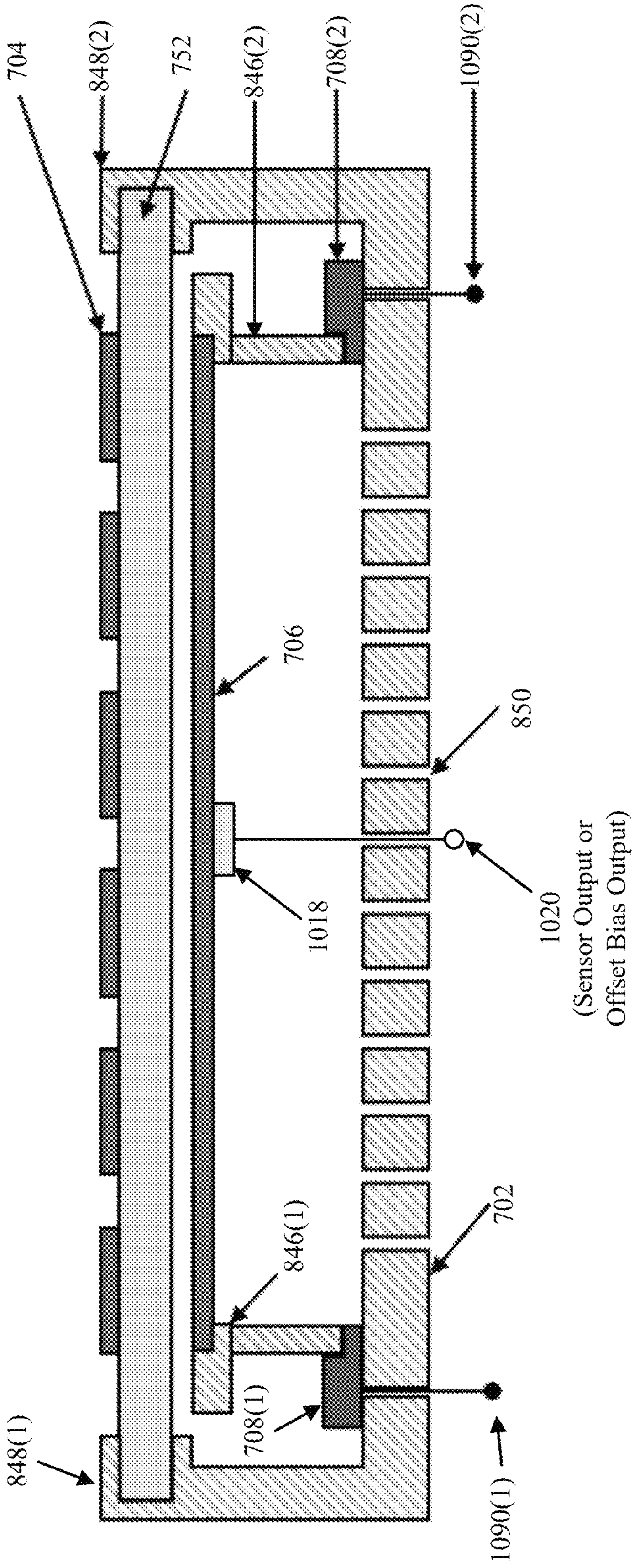
FIG. 10 is a cross-sectional view of the example reconfigurable surface, including a tuning mechanism and parts of the reflective metasurface, including for temperature compensation, in accordance with various example embodiments and implementations of the subject disclosure.

Additional details of the panel are shown in the cross-sectional 2D projection or front view representation in FIG. 10, highlighting various parts and the tuning mechanism. The labeled parts in FIG. 10 include the housing 702, the metallic elements 704, the flexible ground plane sheet 706, the substrate 752 and the perforations 850. Two of the four flexible ground plane sheet support anchors 846(1) and 846(2) are shown, as are two of the four unit cell substrate supports 848(1) and 848(2).

FIG. 10 also highlights how two of the four linear actuators 708(1) and 708(2) are controllable via control terminals 1090(1) and 1090(2) for driving the motors thereof via a controller or the like. As described herein, a temperature compensation component 1018 provides sensor output (e.g., temperature data via temperature sensor 218 of FIG. 2A) or temperature-based offset voltage bias (via temperature device 238 of FIG. 2B) to a terminal or the like 1020 for use in compensating the actuators' driving distances based on temperature.

The housing 702 and support structure or anchors 848(1) and 848(2) can be made using various materials, such as TEFLON, ABS, PET, PET-G and/or any other commonly available RF transparent material. The thickness of the flexible sheet 706 needs to be thick enough to not allow mechanical breakage or failure, yet thin enough to accommodate the force of the linear motors 708(1)-708(2). A slightly thicker sheet can be used as the panel size increases, to avoid creating a negative budge in the center due to gravity. A simple support structure/spring (not explicitly shown) can be used in the middle of the sheet 706 to mitigate this concern without increasing any complexity in the design.

In one example implementation, commercially available linear motion actuators, such as such as Ladex part number 195200-237, can provide up to one-half inch of linear motion. Other, similar linear actuators can be used for larger motion displacement. In this example implementation, the actuators are placed at 45-degree angles in each corner to provide linear motion or force towards the interior of the cavity/housing as generally represented herein.

It should be noted that straightforward beam shaping can be accomplished by driving the motors the same amount in each direction. However, this is not a limitation, and different amounts of driving and/or different driving angles can achieve more complex phase profiles. Further, note that while feasible to use less than four actuators to achieve different phase profiles, e.g., one that pushes up the center, or two actuators (or three) that push two (or three) moveable corners of the ground plane towards two (or one) fixed corner(s) of the ground plane, it has been found that for many applications too sharp of a gradient results from doing so, and thus for many applications four actuators provide desirable results.

Figure 11:
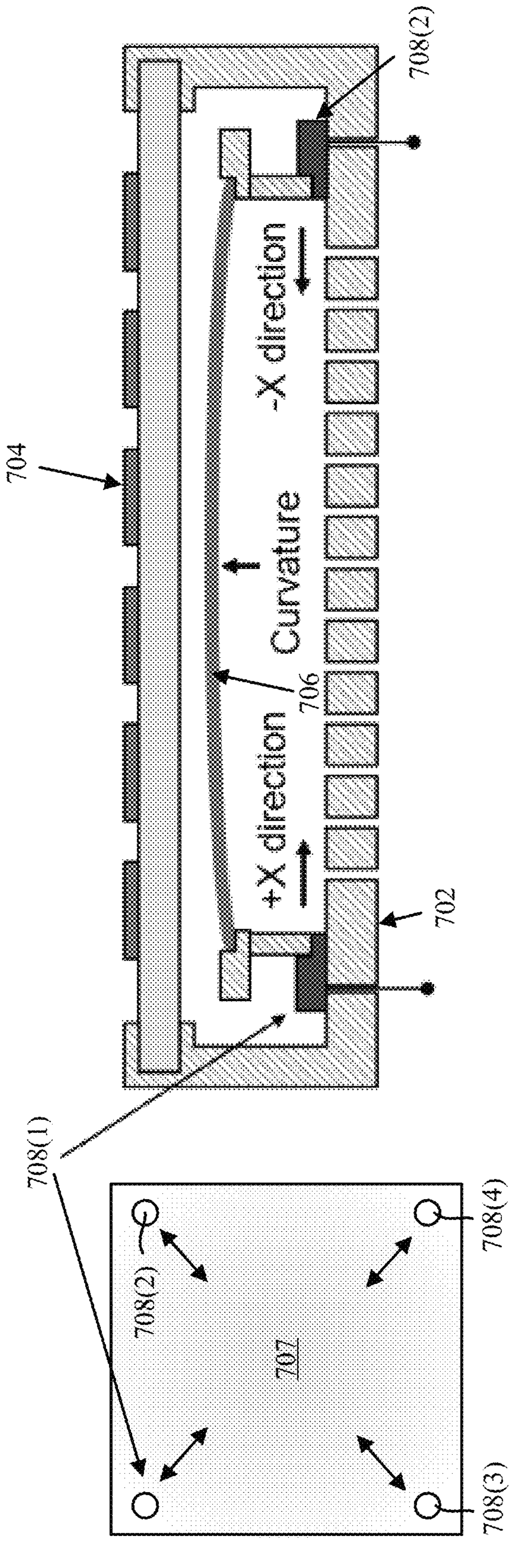
FIG. 11 is a cross-sectional view of the example reconfigurable surface showing how actuating linear actuators create curvature in the ground plane that can be tuned in analog style, in accordance with various example embodiments and implementations of the subject disclosure.
Figure 12:
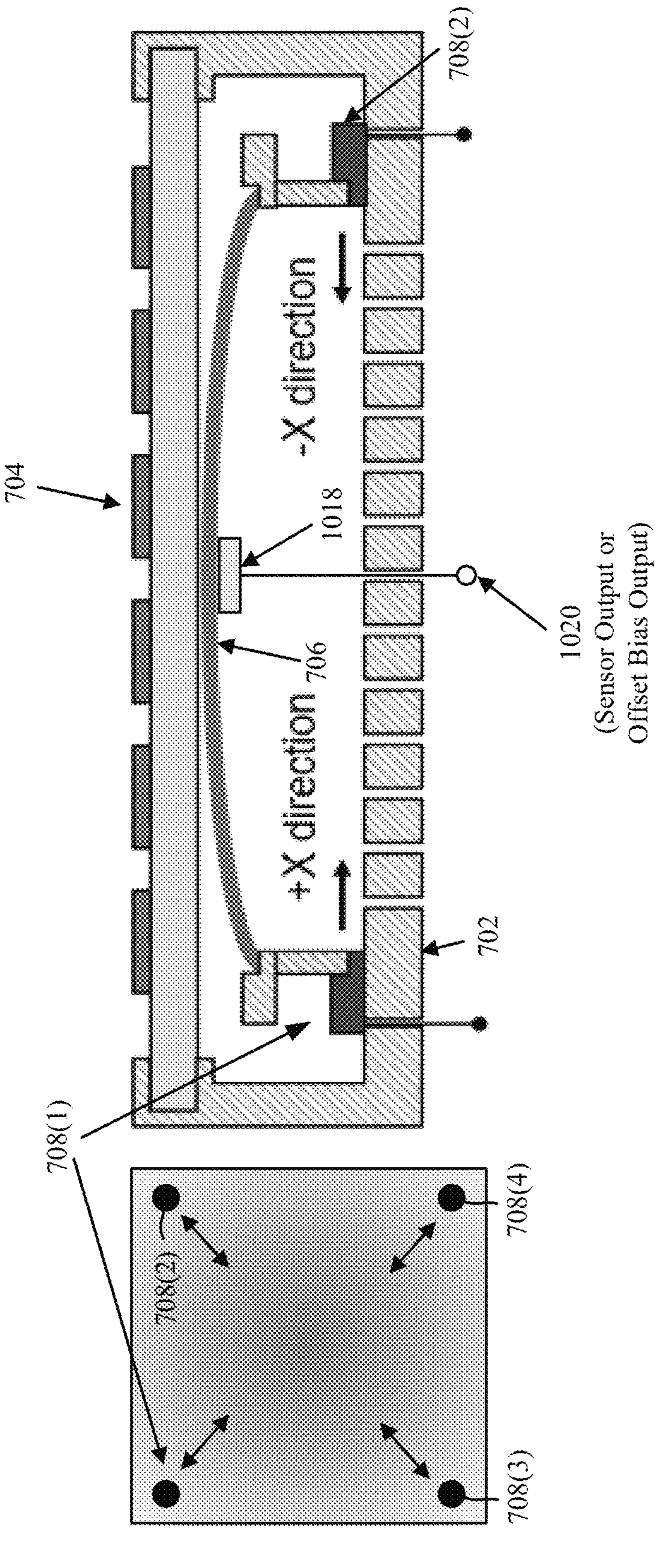
FIG. 12 is a cross-sectional view of the example reconfigurable surface showing how the flexible metallic ground plane sheet can be bent based on temperature changes, in accordance with various example embodiments and implementations of the subject disclosure.

FIGS. 11 and 12 show example representations of how the flexible metal sheet ground plane 706 can be curved to achieve different phase profiles. The linear actuators 708(1)-708 (4) when actuated towards each other push the movable metal sheet 706 towards the inside of the housing 702, creating a curvature in the middle of the ground plane 706. How much curvature is dependent on how far the actuators are extended, as highlighted in FIG. 11 (less curvature) versus FIG. 12 (more curvature). The amount of curvature dictates the beam width or beam shape. The lighter-shaded dots representing the linear actuators 708(1)-708(4) in FIG. 11 represent less linear displacement (corresponding to low bias) from the actuator extension, while the darker-shaded dots representing the linear actuators 708(1)-708(4) in FIG. 12 represent relatively more linear displacement/actuator extension (corresponding to higher or full bias). As can be seen, in both FIGS. 11 and 12, the gaps between the distinct metallic elements of the unit cells and the distinct portions of the ground plane beneath each metallic element vary with the amount of curvature.

Figure 13:
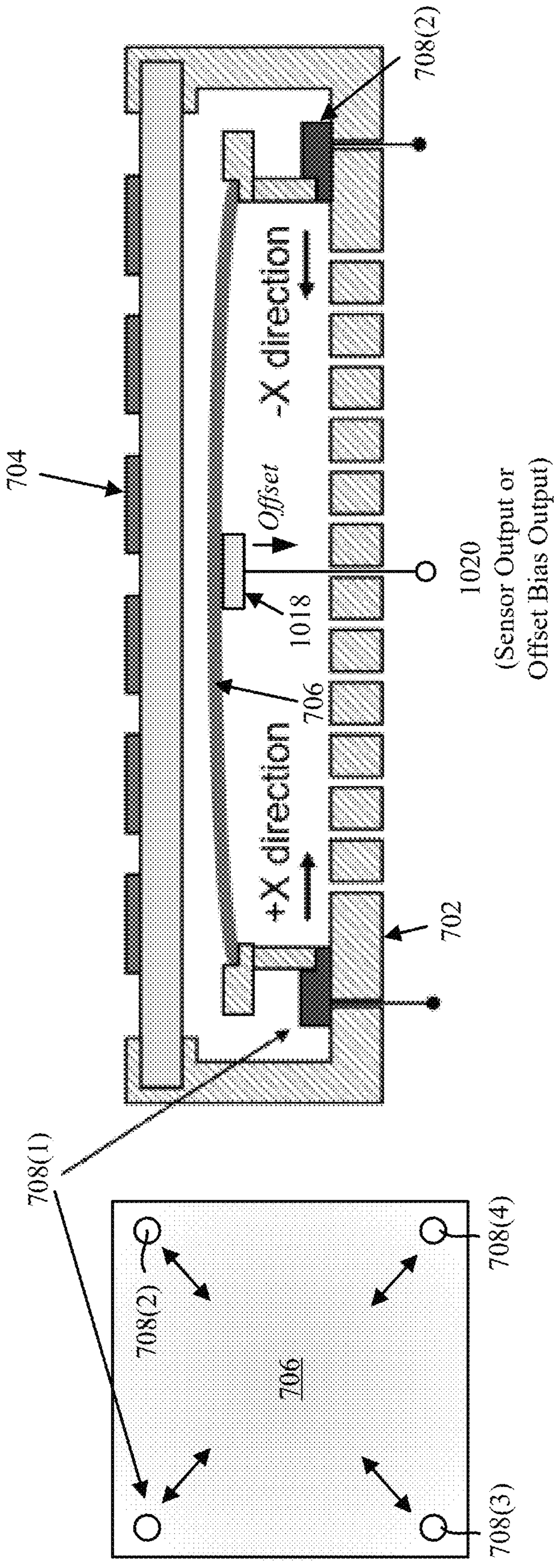
FIG. 13 is a cross-sectional view of the example reconfigurable surface showing how the flexible metallic ground plane sheet of FIG. 12 can be brought back to a desired location and flex amount based on the temperature data, flexure, and providing corresponding temperature compensation offset amounts to the linear actuators, in accordance with various example embodiments and implementations of the subject disclosure.

As shown in FIGS. 12 and 13, any change in the internal or external temperature can affect the gap between the substrate 752 (FIG. 10, not visible in FIGS. 12 and 13) and the thin flexible metal sheet 706. The thin flexible metal sheet 706 can be curled upwards or can be bent more downwards due to increase or decrease in the temperature, e.g., relative to an ambient design temperature. The temperature compensator component 1018 including a sensor connected in the middle of the metallic sheet (or proximate thereto) can detect an appropriate temperature; during determination of the temperature-dependent offset voltages, e.g., before deployment, the flexure can be characterized with a temperature sweep. For example, the flexure can be characterized in full-wave finite element modeler simulation tool by realistically including the material properties, or can also be experimentally characterized in a temperature chamber typically used for electronics reliability testing. The change in the flexing/bowing data with respect to the change in temperature can be stored, and the delta change can be fed to the microcontroller (or other voltage combiner) to offset the actuation drive either in forward or backward directions depending on the type of bend.

Thus, the temperature related offset is shown in FIGS. 12 and 13, respectively, highlighting the offset of the curvature by driving the actuators such that the desired beamforming directivity can be achieved. More particularly, consider that in the example of FIG. 12, the flexible sheet 706 is bent more than appropriate for a desired phase profile due to the current temperature. In contrast, in the example of FIG. 13, the thin flexible metallic sheet is brought back to the desired location by reading the corresponding temperature data, flexure, and providing the corresponding offset to the linear actuators.

Figure 14:
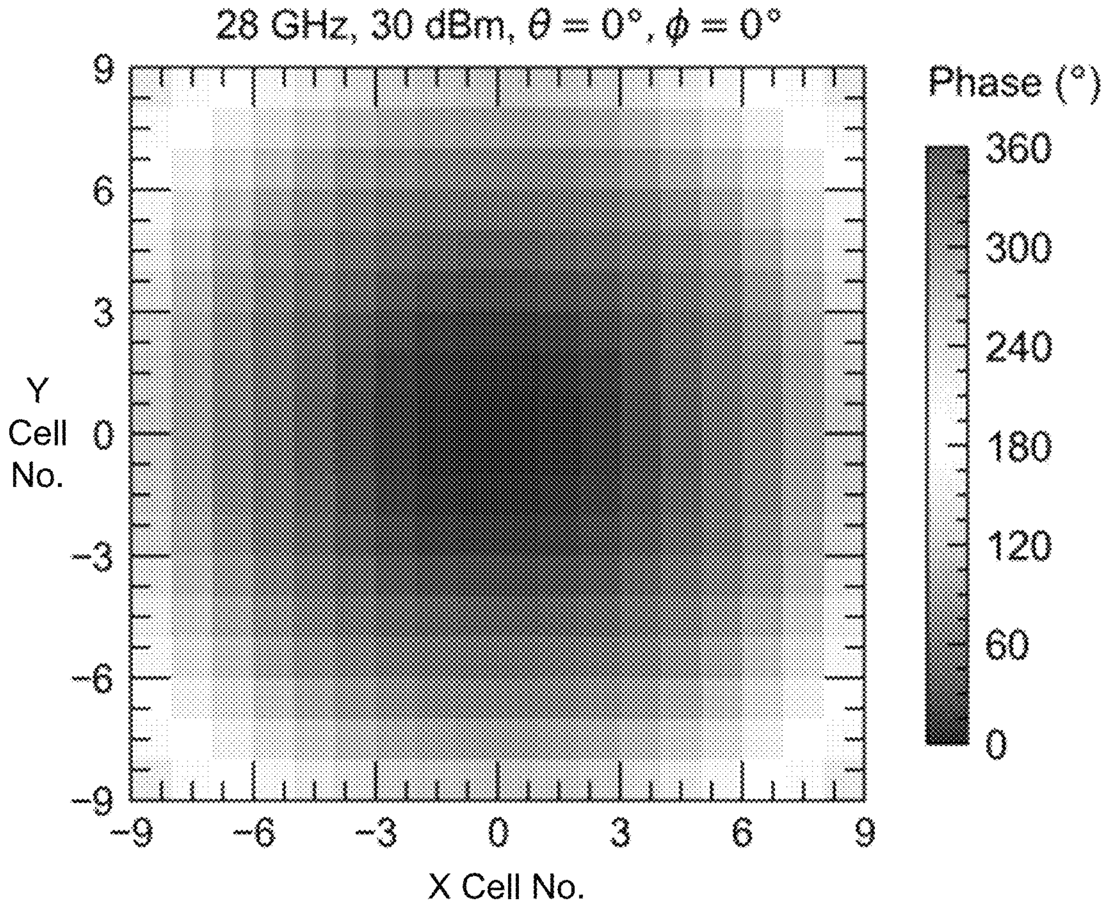
FIG. 14 is an example simulated phase profile of an 18×18 unit-cell reconfigurable surface panel that demonstrates beam shape change with a change of ground plane curvature, in accordance with various example embodiments and implementations of the subject disclosure.
Figure 15:
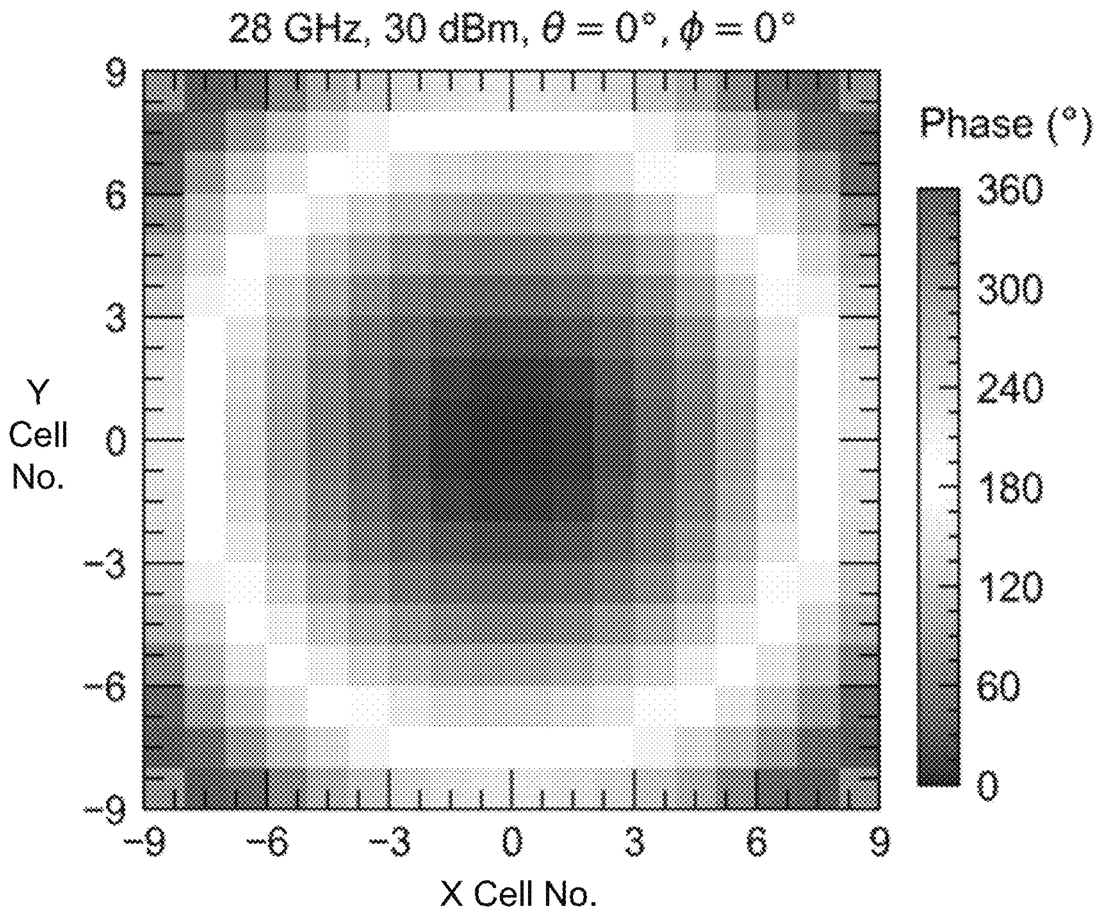
FIG. 15 is an example simulated phase profile of an 18×18 unit-cell reconfigurable surface panel that demonstrates beam shape change with a different change of ground plane curvature (relative to FIG. 14), in accordance with various example embodiments and implementations of the subject disclosure.
Figure 16:
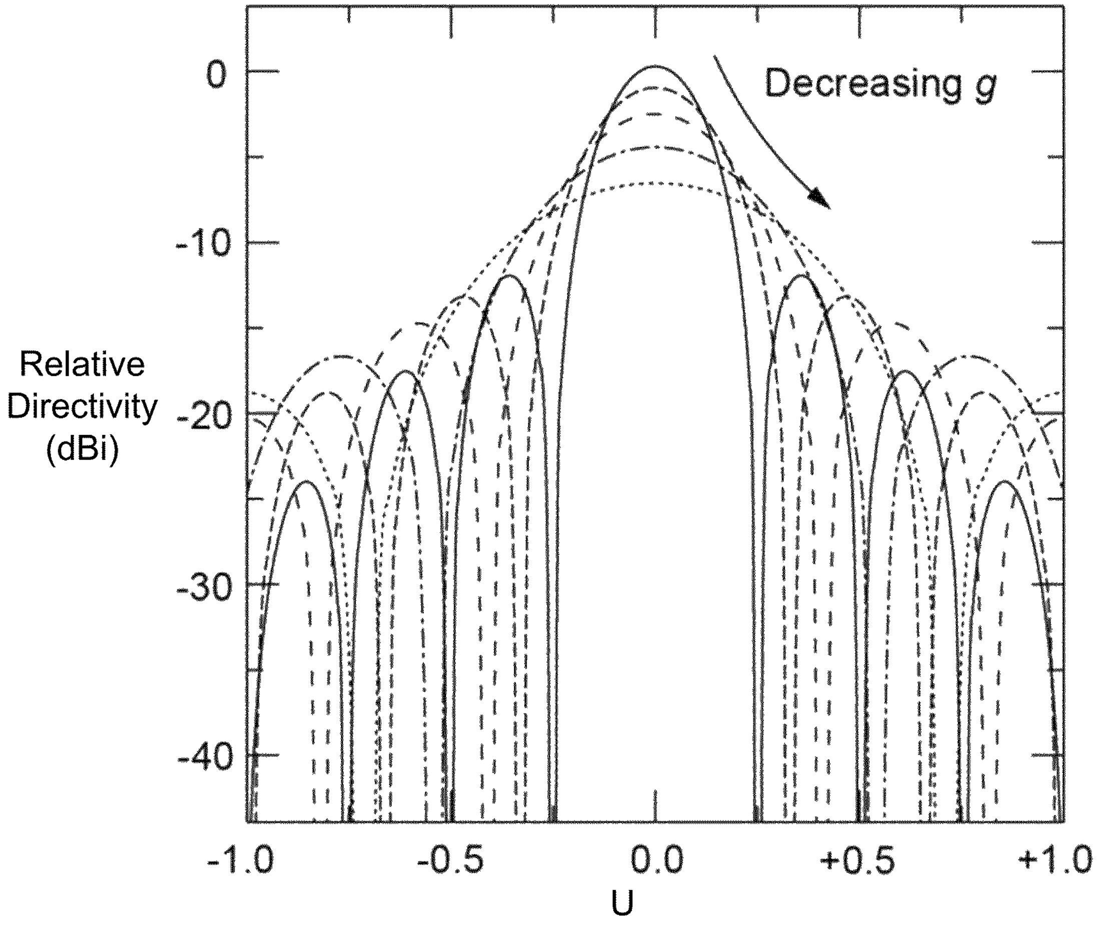
FIG. 16 is an example graph showing a simulation of relative directivity response of a 64-cell metasurface showing how the beam shape can be adjusted based on varying (including decreasing) gap distances, in accordance with various example embodiments and implementations of the subject disclosure.
Figure 17:
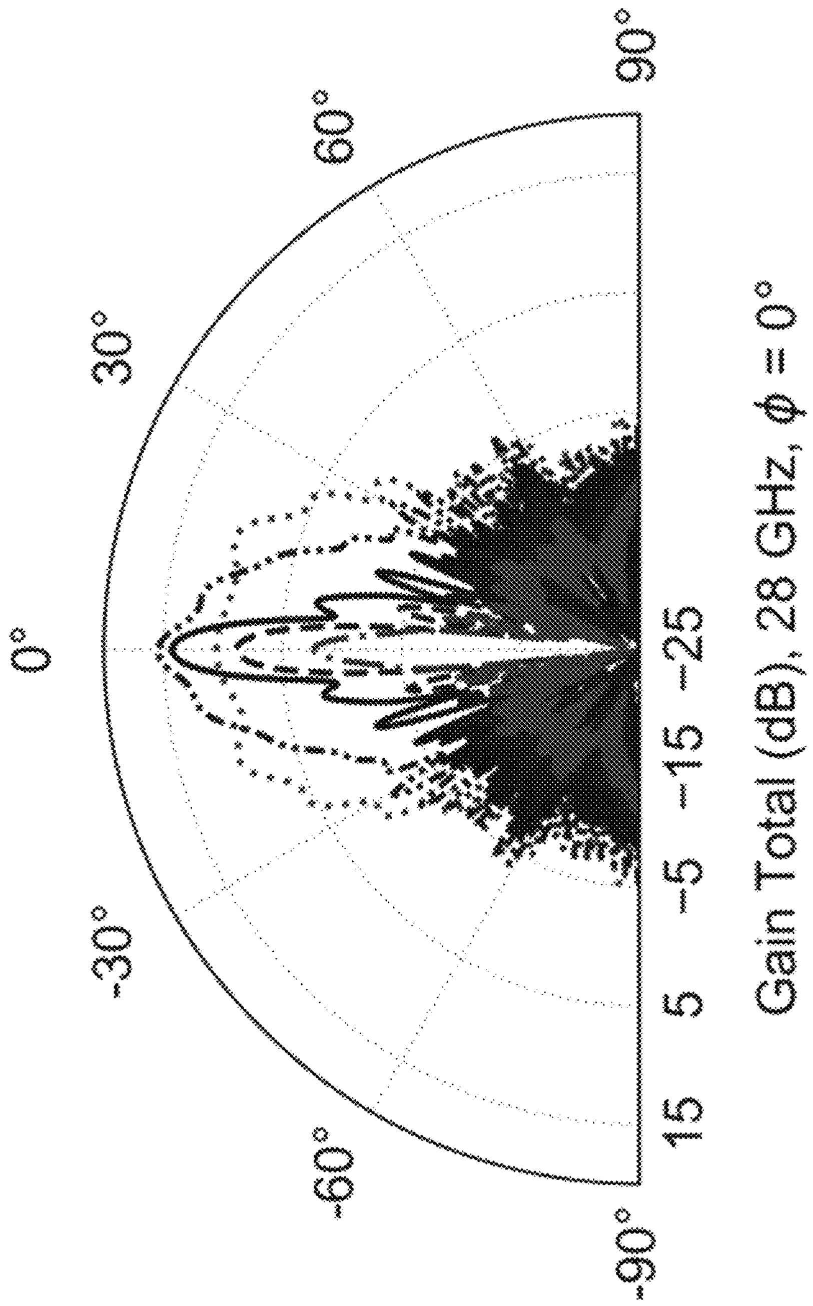
FIG. 17 is an example graph showing gain for different ground plane curvature positions, in accordance with various example embodiments and implementations of the subject disclosure.

FIGS. 14 and 15 are example representations of a simulated (e.g., using Ansys HFSS) phase profile of an 18×18 unit-cell panel that demonstrate different beam shape changes with a change of curvature. The simulation proof can be further proven using Ansys HFSS. More particularly, an 8×8 panel was designed and analyzed as shown in FIG. 16, resulting in beam shape change with change in the gap between substrate and the movable metal sheet. The simulated relative directivity response of the 64-cell metasurface shows that with decreasing gap, (normalized from −1.0 to +1.0), the beam shape can be tweaked, and vice-versa for increasing gap. FIG. 17 shows beam shaping on a semi-polar plot for the panel, that is, the gain (in dB) for different metal sheet positions based on amount of curvature.

One or more example embodiments can be embodied in a reconfigurable surface, such as described and represented herein. The reconfigurable surface can include a reconfigurable surface panel, which can include respective metallic resonating elements of respective unit cells located at an upper portion of the reconfigurable surface to reflect an electromagnetic signal impinging on the reconfigurable surface as a reflected beam, and a flexible metallic ground plane beneath the respective metallic resonating elements forming respective gaps between respective areas of the flexible ground plane and the respective metallic resonating elements. The reconfigurable surface further can include a group of linear actuators controllable to curve the flexible ground plane to change respective distances corresponding to the respective gaps between the respective areas of the flexible ground plane and the respective resonating metallic elements, a temperature compensator coupled to a temperature sensor that determines a temperature-based voltage offset value dataset based on temperature data from the temperature sensor, and a controller that obtains a non-offset voltage value dataset, for combining with the temperature-based voltage offset value dataset, to drive the group of linear actuators to controllably curve the flexible ground plane to determine a phase profile of the reconfigurable surface that can be usable to determine a shape of the reflected beam.

The temperature compensator can include logic in the controller that accesses a lookup table, based on the temperature data, to obtain the temperature-based voltage offset value dataset for combination, by the controller, with the non-offset voltage value dataset.

The temperature compensator can include logic, coupled to the temperature sensor, that accesses a lookup table, based on the temperature data, to obtain the voltage offset value dataset for modification of the non-offset voltage value dataset obtained by the controller.

The temperature sensor can be physically coupled to the flexible metallic ground plane.

The respective distances can be first respective distances, the phase profile can be a first phase profile that determines a first shape of the reflected beam, and the non-offset voltage value dataset combined with the voltage offset value dataset controllably drives the group of linear actuators to curve the flexible ground plane to change the respective distances from the first respective distances to second respective distances that determine a second phase profile of the reconfigurable surface that determines a second shape of the reflected beam.

The flexible ground plane has four respective corners, and the group of linear actuators can include four respective linear actuators mechanically coupled to the four respective corners. The four respective linear actuators can be mechanically coupled to the four respective corners via four respective support anchors. The four respective linear actuators can be configured to curve the flexible ground plane by driving the four respective corners towards a center of the reconfigurable surface panel.

The reconfigurable surface further can include a housing that contains the respective metallic resonating elements, the flexible metallic ground plane and the group of linear actuators.

The group of linear actuators can include respective linear actuators that can be respectively angled relative to the flexible ground plane with respect to respective driving directions of the respective linear actuators.

The respective driving directions of the respective linear actuators can be towards a center of the reconfigurable surface panel, and away from the center of the reconfigurable surface panel.

Figure 18:
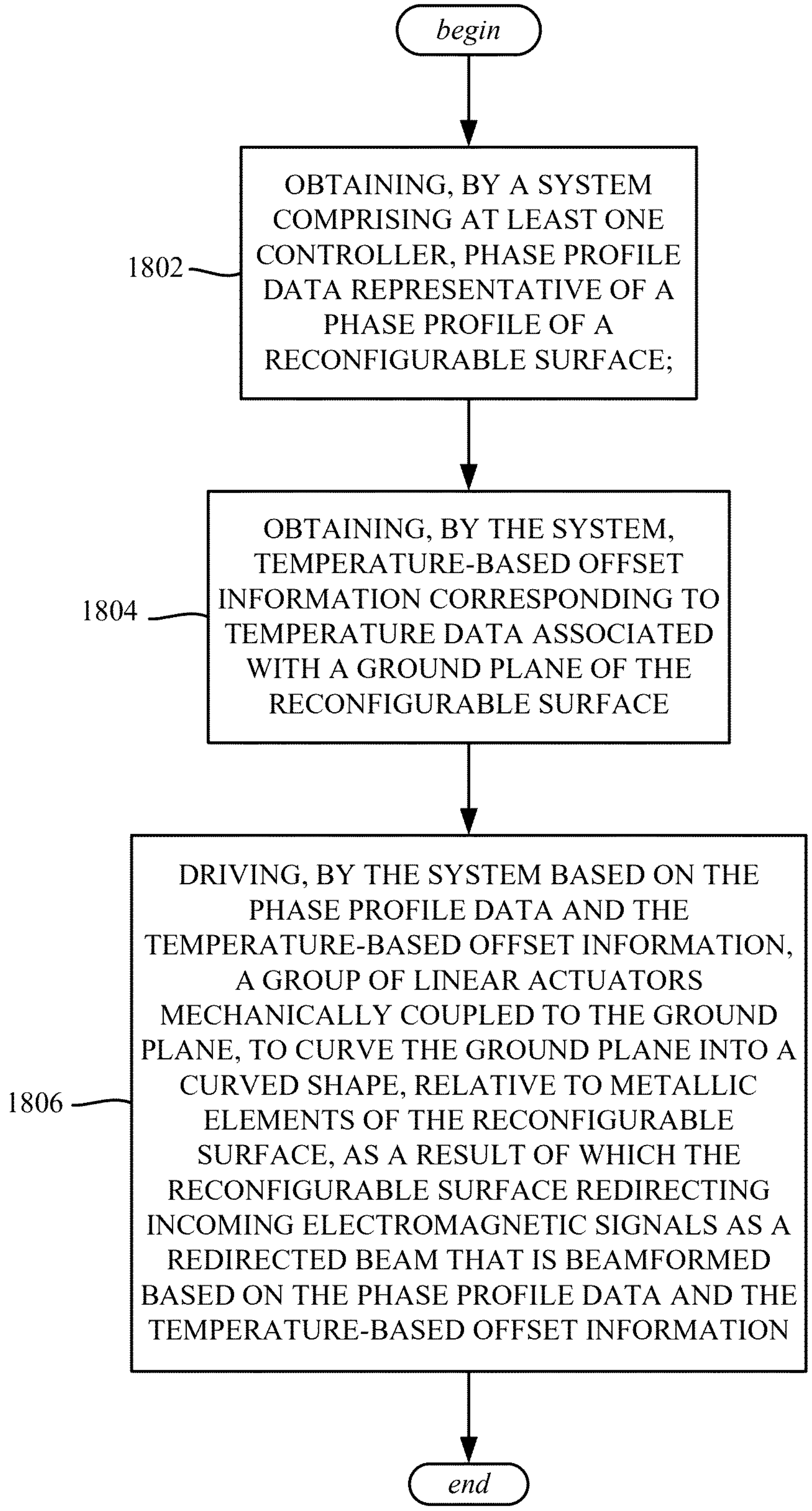
FIG. 18 is a flow diagram showing example operations related to driving a group of linear actuators to curve a ground plane based on phase profile data and temperature data, in accordance with various example embodiments and implementations of the subject disclosure.

One or more example embodiments, such as corresponding to example operations of a method, can be represented in FIG. 18. Example operation 1802 represents obtaining, by a system comprising at least one controller, phase profile data representative of a phase profile of a reconfigurable surface. Example operation 1804 represents obtaining, by the system, temperature-based offset information corresponding to temperature data associated with a ground plane of the reconfigurable surface. Example operation 1806 represents driving, by the system based on the phase profile data and the temperature-based offset information, a group of linear actuators mechanically coupled to the ground plane, to curve the ground plane into a curved shape, relative to metallic elements of the reconfigurable surface, as a result of which the reconfigurable surface redirecting incoming electromagnetic signals as a redirected beam that can be beamformed based on the phase profile data and the temperature-based offset information.

Obtaining the temperature-based offset information can include obtaining, based on the temperature data, a first voltage value dataset corresponding to the temperature-based offset information, and further comprising obtaining, by the system based on the phase profile data, a second voltage value dataset, and combining, by the system, the first voltage value dataset and the second voltage value dataset to output a combined voltage value dataset for the driving of the group of linear actuators.

The phase profile data can be first phase profile data, the temperature-based offset information can be first temperature-based offset information corresponding to first temperature data, the redirected beam can be a first redirected beam, the curved shape can be a first curved shape, and further operations can include obtaining, by the system, second temperature-based offset information corresponding to second temperature data associated with the ground plane, obtaining, by the system, second phase profile data representative of a second phase profile of the reconfigurable surface, and driving, by the controller based on the second phase profile data and the second temperature-based offset information, the group of linear actuators to curve the ground plane into a second curved shape that results in the reconfigurable surface redirecting the incoming electromagnetic signals as a second redirected beam that can be beamformed based on the second phase profile data and the second temperature-based offset information.

Driving the group of linear actuators to curve the ground plane changes an average gap between the metallic elements and the ground plane to narrow the second redirected beam relative to the first redirected beam.

The ground plane can include four respective corners, the group of linear actuators can include four respective linear actuators mechanically coupled to the four respective corners, and driving the group of linear actuators can include driving the four respective corners towards a center of the reconfigurable surface to curve the ground plane into the curved shape.

One or more example embodiments can be embodied in a system, such as described and represented herein. The system can include respective metallic resonating elements of respective unit cells located at an upper portion of a reconfigurable surface, a flexible metallic ground plane adjacent to the respective metallic resonating elements that forms respective gaps between respective portions of the flexible ground plane and the respective metallic resonating elements, and a group of linear actuators controllable to curve the flexible ground plane to change respective distances corresponding to the respective gaps between the respective areas of the flexible ground plane and the respective resonating metallic elements. The system further can include a temperature compensator that determines a voltage offset value dataset based on temperature data obtained from a temperature sensor, and a controller that mechanically curves the flexible metallic ground plane based on the voltage offset value dataset, and, based on a non-offset voltage dataset corresponding to phase profile data, that determines respective distances between the respective portions of the flexible ground plane and the respective resonating metallic elements. The respective distances can be usable to determine a shape of a beamformed beam reflected by the reconfigurable surface from an electromagnetic signal impinging on the reconfigurable surface.

The temperature compensator can be incorporated into the controller.

The temperature compensator can include a device configured to output the voltage offset value dataset for combination with the non-offset voltage dataset.

The flexible metallic ground plane can include four respective corners, the group of linear actuators can include four respective mechanical actuators mechanically coupled to the four respective corners, and the controller can mechanically curve the flexible metallic ground plane by driving the four respective mechanical actuators to push the four respective corners towards one another.

As can be seen, the technology described herein is directed to a beam shaping device based on mechanical tuning, such as with only four linear actuators per panel regardless of panel size or number of unit-cells; (this is in contrast to existing mechanisms that have tunable component soldered on each unit-cell). The linear actuators are driven to achieve a desired phase profile, with temperature compensation applied as needed to offset the driving amounts. The technology described herein provides analog-style beam shaping capability with only four set of wires/actuation points per panel instead of quantized states in electronic panels. As such, an expensive FPGA controller or the like is not needed, as the motors can be controlled using a commercial off-the-shelf microcontroller. This further facilitates low to minimum coding that needs only control four actuators, further driving down the software development and debugging costs.

Benefits thus include beam reconfigurability with reduced cost of manufacturing by utilizing a flexible metal sheet to create a curvature using linear actuators. Low-cost fabrication along with no vendor-specific component requirements help reduce the cost. Indeed, among other benefits, the reconfigurability device described herein offers more than a 95% cost reduction when compared to currently available electronic beam manipulation solutions. For example, scaling up other solutions increases exponentially with cost as the number of unit cells increases exponentially, e.g., an 8×8 unit cell device needs components (PIN diodes and/or varactors) and soldering for 64 unit cells, a 16×16 unit cell device needs components and soldering for 256 unit cells, a 32×32 unit cell device needs components and soldering for 1024 unit cells, and so on. For example, a 64×64 unit cell device with PIN diodes and/or varactors can cost over $10,000 to construct. If a unit-cell requires more than one PIN diode for more tuning states, the cost further exponentially rises. In contrast, the technology described herein operates with four low cost linear actuators regardless of the number of unit cells, whereby a 64×64 unit cell device based on linear actuators as described herein generally costs less than $600.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A reconfigurable surface, comprising:

a reconfigurable surface panel, comprising:

respective metallic resonating elements of respective unit cells located at an upper portion of the reconfigurable surface to reflect an electromagnetic signal impinging on the reconfigurable surface as a reflected beam, and a flexible metallic ground plane beneath the respective metallic resonating elements forming respective gaps between respective areas of the flexible ground plane and the respective metallic resonating elements;

a group of linear actuators controllable to curve the flexible ground plane to change respective distances corresponding to the respective gaps between the respective areas of the flexible ground plane and the respective resonating metallic elements;

a temperature compensator coupled to a temperature sensor that determines a temperature-based voltage offset value dataset based on temperature data from the temperature sensor; and a controller that obtains a non-offset voltage value dataset, for combining with the temperature-based voltage offset value dataset, to drive the group of linear actuators to controllably curve the flexible ground plane to determine a phase profile of the reconfigurable surface that is usable to determine a shape of the reflected beam.

2. The reconfigurable surface of claim 1, wherein the temperature compensator comprises logic in the controller that accesses a lookup table, based on the temperature data, to obtain the temperature-based voltage offset value dataset for combination, by the controller, with the non-offset voltage value dataset.

3. The reconfigurable surface of claim 1, wherein the temperature compensator comprises logic, coupled to the temperature sensor, that accesses a lookup table, based on the temperature data, to obtain the voltage offset value dataset for modification of the non-offset voltage value dataset obtained by the controller.

4. The reconfigurable surface of claim 1, wherein the temperature sensor is physically coupled to the flexible metallic ground plane.

5. The reconfigurable surface of claim 1, wherein the respective distances are first respective distances, wherein the phase profile is a first phase profile that determines a first shape of the reflected beam, and wherein the non-offset voltage value dataset combined with the voltage offset value dataset controllably drives the group of linear actuators to curve the flexible ground plane to change the respective distances from the first respective distances to second respective distances that determine a second phase profile of the reconfigurable surface that determines a second shape of the reflected beam.

6. The reconfigurable surface of claim 1, wherein the flexible ground plane has four respective corners, and wherein the group of linear actuators comprises four respective linear actuators mechanically coupled to the four respective corners.

7. The reconfigurable surface of claim 6, wherein the four respective linear actuators are mechanically coupled to the four respective corners via four respective support anchors.

8. The reconfigurable surface of claim 6, wherein the four respective linear actuators are configured to curve the flexible ground plane by driving the four respective corners towards a center of the reconfigurable surface panel.

9. The reconfigurable surface of claim 1, further comprising a housing that contains the respective metallic resonating elements, the flexible metallic ground plane and the group of linear actuators.

10. The reconfigurable surface of claim 1, wherein the group of linear actuators comprises respective linear actuators that are respectively angled relative to the flexible ground plane with respect to respective driving directions of the respective linear actuators.

11. The reconfigurable surface of claim 10, wherein the respective driving directions of the respective linear actuators are towards a center of the reconfigurable surface panel, and away from the center of the reconfigurable surface panel.

12. A method, comprising:

obtaining, by a system comprising at least one controller, phase profile data representative of a phase profile of a reconfigurable surface;

obtaining, by the system, temperature-based offset information corresponding to temperature data associated with a ground plane of the reconfigurable surface; and driving, by the system based on the phase profile data and the temperature-based offset information, a group of linear actuators mechanically coupled to the ground plane, to curve the ground plane into a curved shape, relative to metallic elements of the reconfigurable surface, as a result of which the reconfigurable surface redirecting incoming electromagnetic signals as a redirected beam that is beamformed based on the phase profile data and the temperature-based offset information.

13. The method of claim 12, wherein the obtaining of the temperature-based offset information comprises obtaining, based on the temperature data, a first voltage value dataset corresponding to the temperature-based offset information, and further comprising obtaining, by the system based on the phase profile data, a second voltage value dataset, and combining, by the system, the first voltage value dataset and the second voltage value dataset to output a combined voltage value dataset for the driving of the group of linear actuators.

14. The method of claim 12, wherein the phase profile data is first phase profile data, wherein the temperature-based offset information is first temperature-based offset information corresponding to first temperature data, wherein the redirected beam is a first redirected beam, wherein the curved shape is a first curved shape, and further comprising obtaining, by the system, second temperature-based offset information corresponding to second temperature data associated with the ground plane, obtaining, by the system, second phase profile data representative of a second phase profile of the reconfigurable surface, and driving, by the controller based on the second phase profile data and the second temperature-based offset information, the group of linear actuators to curve the ground plane into a second curved shape that results in the reconfigurable surface redirecting the incoming electromagnetic signals as a second redirected beam that is beamformed based on the second phase profile data and the second temperature-based offset information.

15. The method of claim 14, wherein the driving of the group of linear actuators to curve the ground plane changes an average gap between the metallic elements and the ground plane to narrow the second redirected beam relative to the first redirected beam.

16. The method of claim 12, wherein the ground plane comprises four respective corners, wherein the group of linear actuators comprises four respective linear actuators mechanically coupled to the four respective corners, and wherein the driving of the group of linear actuators comprises driving the four respective corners towards a center of the reconfigurable surface to curve the ground plane into the curved shape.

17. A system, comprising:

respective metallic resonating elements of respective unit cells located at an upper portion of a reconfigurable surface;

a flexible metallic ground plane adjacent to the respective metallic resonating elements that forms respective gaps between respective portions of the flexible ground plane and the respective metallic resonating elements;

a group of linear actuators controllable to curve the flexible ground plane to change respective distances corresponding to the respective gaps between the respective areas of the flexible ground plane and the respective resonating metallic elements;

a temperature compensator that determines a voltage offset value dataset based on temperature data obtained from a temperature sensor; and a controller that mechanically curves the flexible metallic ground plane based on the voltage offset value dataset, and, based on a non-offset voltage dataset corresponding to phase profile data, that determines respective distances between the respective portions of the flexible ground plane and the respective resonating metallic elements, wherein the respective distances are usable to determine a shape of a beamformed beam reflected by the reconfigurable surface from an electromagnetic signal impinging on the reconfigurable surface.

18. The system of claim 17, wherein the temperature compensator is incorporated into the controller.

19. The system of claim 17, wherein the temperature compensator comprises a device configured to output the voltage offset value dataset for combination with the non-offset voltage dataset.

20. The system of claim 17, wherein the flexible metallic ground plane comprises four respective corners, wherein the group of linear actuators comprises four respective mechanical actuators mechanically coupled to the four respective corners, and wherein the controller mechanically curves the flexible metallic ground plane by driving the four respective mechanical actuators to push the four respective corners towards one another.

* * * * *